(12) United States Patent
Lee et al.

(10) Patent No.: US 11,453,055 B2
(45) Date of Patent: Sep. 27, 2022

(54) METHOD OF MANUFACTURING A METAL COLUMN

(71) Applicant: KOREA INSTITUTE OF SCIENCE AND TECHNOLOGY, Seoul (KR)

(72) Inventors: Ji Won Lee, Seoul (KR); Soo Yeol Phyo, Seoul (KR); Sun Choi, Seoul (KR); Sung Choi, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 192 days.

(21) Appl. No.: 16/921,254

(22) Filed: Jul. 6, 2020

(65) Prior Publication Data
US 2021/0370393 A1 Dec. 2, 2021

(30) Foreign Application Priority Data
May 29, 2020 (KR) .......................... 10-2020-0065242

(51) Int. Cl.
| | |
|---|---|
| *B22F 3/24* | (2006.01) |
| *C09D 183/04* | (2006.01) |
| *B33Y 40/20* | (2020.01) |
| *C22C 14/00* | (2006.01) |
| *B33Y 10/00* | (2015.01) |

(Continued)

(52) U.S. Cl.
CPC .............. *B22F 3/24* (2013.01); *B05D 3/0209* (2013.01); *B05D 5/08* (2013.01); *B05D 7/22* (2013.01); *B22F 5/10* (2013.01); *B22F 10/00* (2021.01); *B22F 10/28* (2021.01); *B22F 10/62* (2021.01); *B33Y 10/00* (2014.12); *B33Y 40/20* (2020.01); *C09D 183/04* (2013.01); *C22C 14/00* (2013.01); *C23C 18/04* (2013.01); *C23C 18/122* (2013.01); *B05D 2202/00* (2013.01); *B05D 2518/12* (2013.01); *B22F 2003/242* (2013.01); *B22F 2301/205* (2013.01)

(58) Field of Classification Search
CPC ...................................... B22F 10/62
See application file for complete search history.

(56) References Cited

U.S. PATENT DOCUMENTS

| | | | | |
|---|---|---|---|---|
| 5,840,388 A | * | 11/1998 | Karger | ................ B01J 20/262 428/34.7 |
| 8,088,350 B2 | | 1/2012 | Betz et al. | |
| 2017/0173513 A1 | * | 6/2017 | Lautamo | ............ G01N 30/6069 |

FOREIGN PATENT DOCUMENTS

| | | |
|---|---|---|
| JP | 2008-241543 A | 10/2008 |
| KR | 10-2018-0123392 A | 11/2018 |

OTHER PUBLICATIONS

S. Sandron et al., 3D printed metal columns for capillary liquid chromatography, Royal Society of Chemistry, Analyst, Sep. 30, 2014, pp. 6343-6347, vol. 139.

(Continued)

*Primary Examiner* — Christopher S Kessler
(74) *Attorney, Agent, or Firm* — Goldilocks Zone IP Law

(57) ABSTRACT

Embodiments of the present disclosure provide a method of manufacturing a metal column using 3D printing technology. The method of manufacturing a metal column includes steps of: creasing a 3D-CAD design for printing the metal column; printing the metal column; pretreating the inner surface of a channel inside the metal column at low temperature; and coating the inner surface of the channel with a stationary phase so that the metal column is capable of separating a gas mixture into components.

11 Claims, 8 Drawing Sheets

(51) Int. Cl.
    *B22F 10/00*         (2021.01)
    *C23C 18/04*        (2006.01)
    *B22F 5/10*          (2006.01)
    *B22F 10/28*         (2021.01)
    *B22F 10/62*         (2021.01)
    *C23C 18/12*        (2006.01)
    *B05D 7/22*          (2006.01)
    *B05D 3/02*          (2006.01)
    *B05D 5/08*          (2006.01)

(56) References Cited

OTHER PUBLICATIONS

Md. Musfiqur Rahman et al., Basic Overview on Gas Chromatography Columns, Analytical Separation Science, 2015, pp. 823-834.

\* cited by examiner

[FIG. 1]
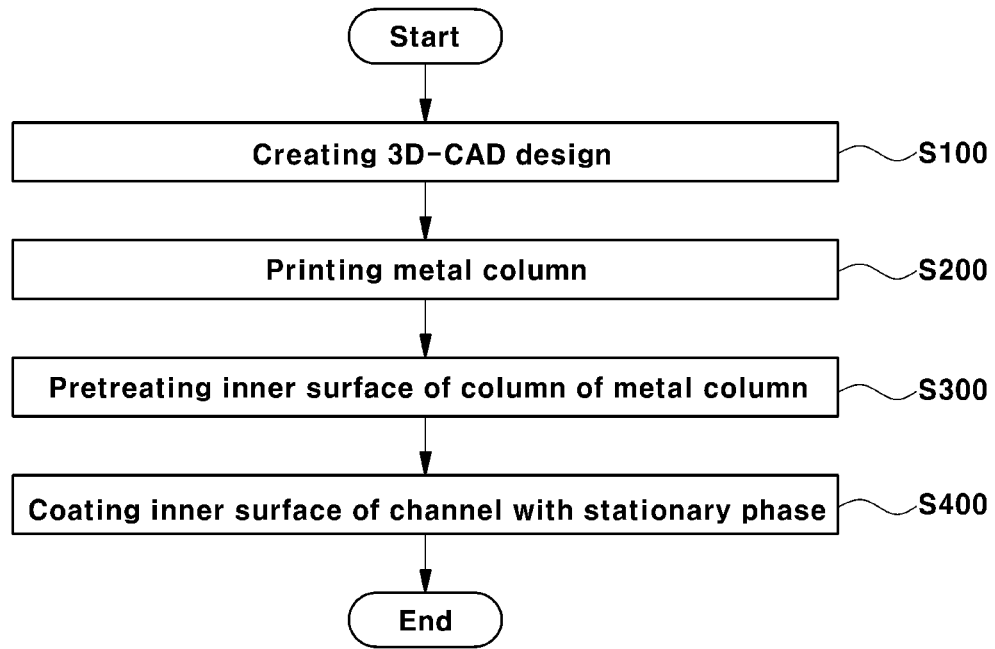
[FIG. 2]
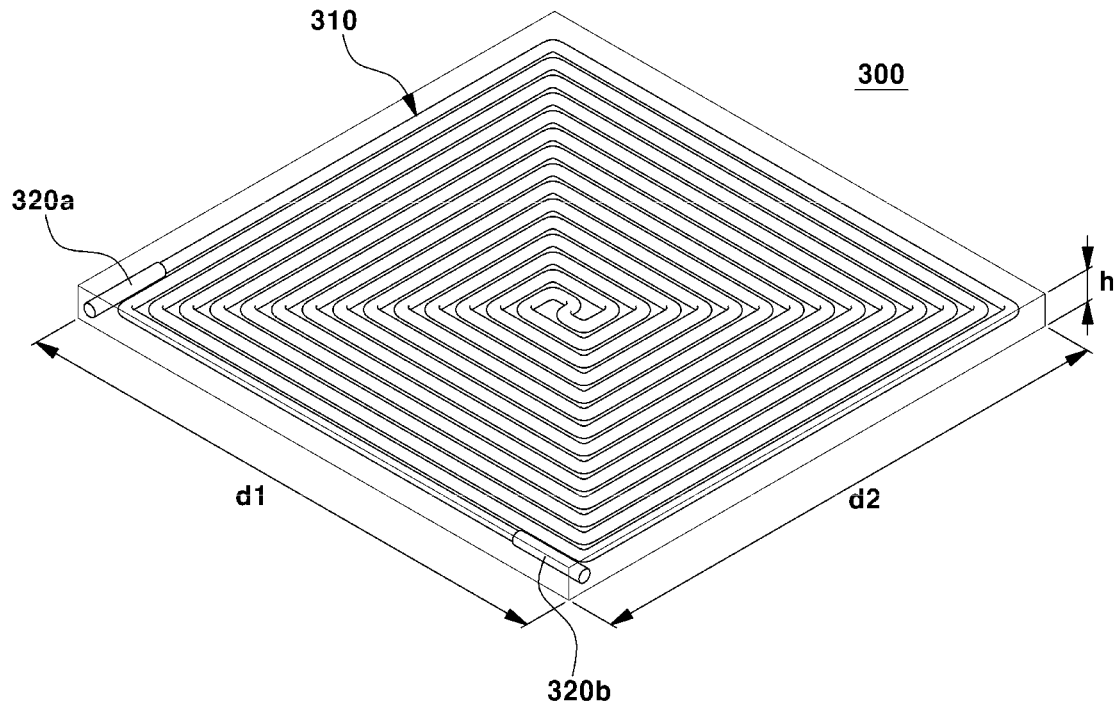

[FIG. 3]
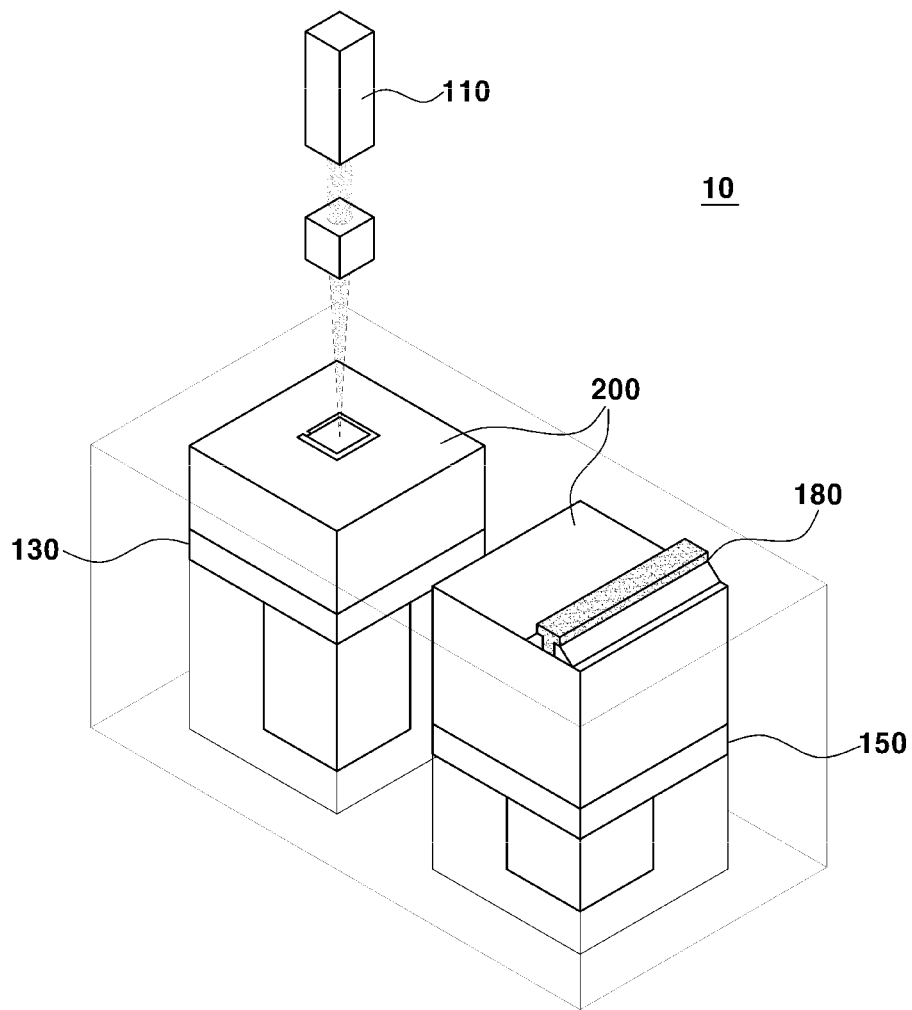

[FIG. 4a]
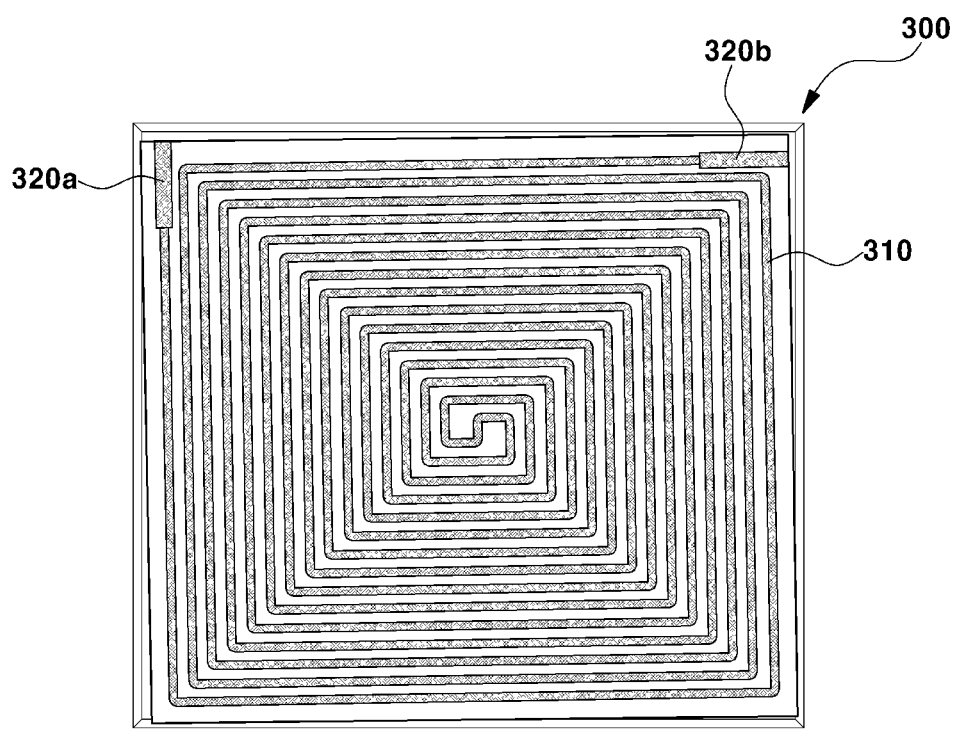
[FIG. 4b]
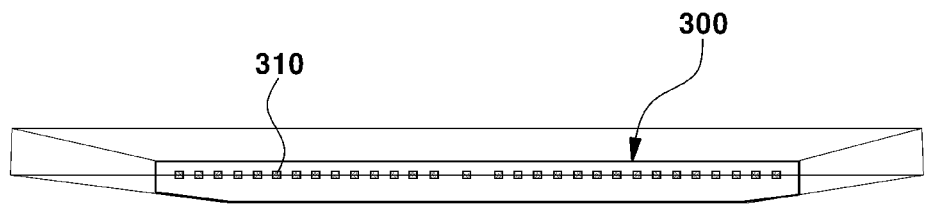

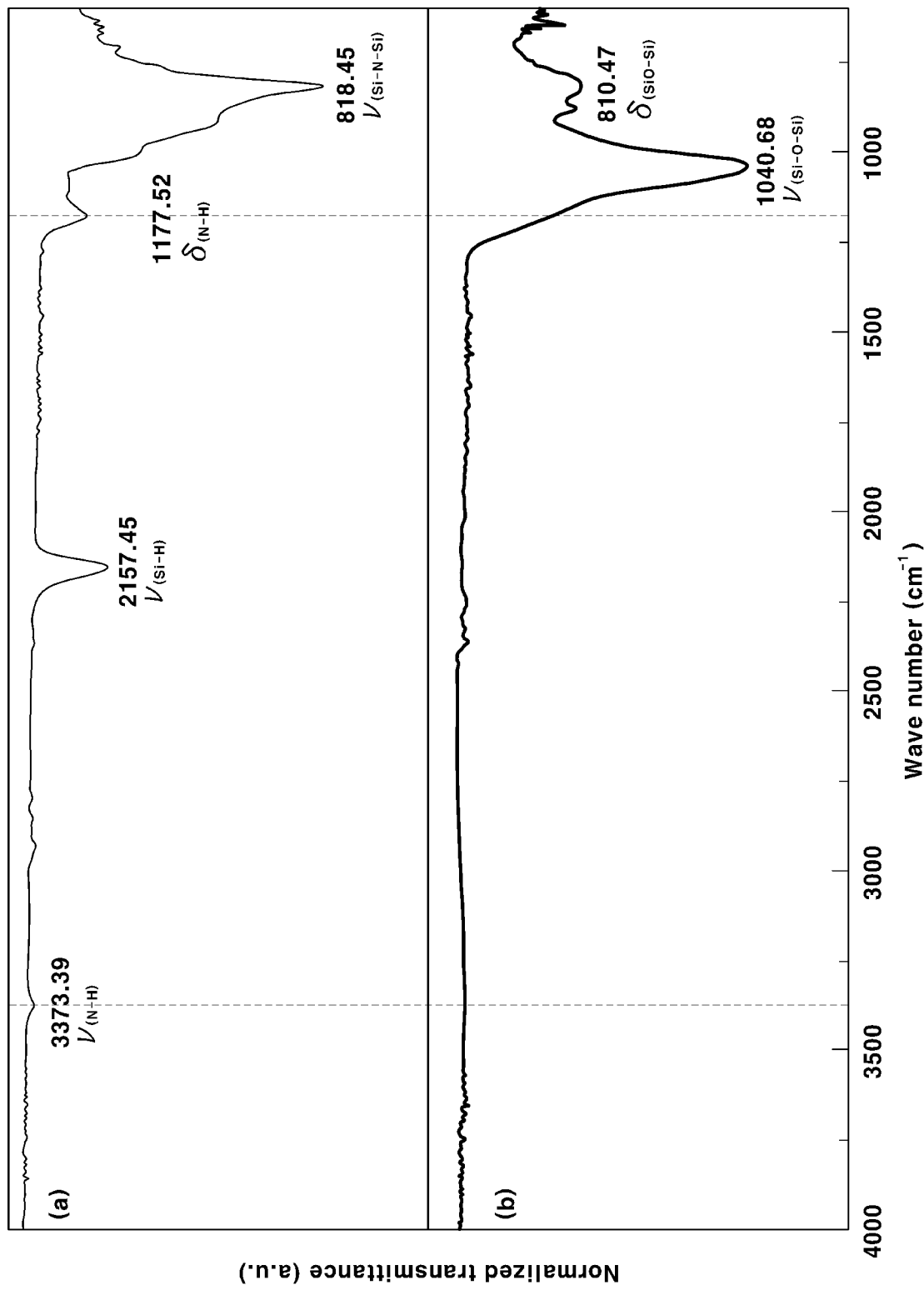
[FIG. 5]

[FIG. 6a]
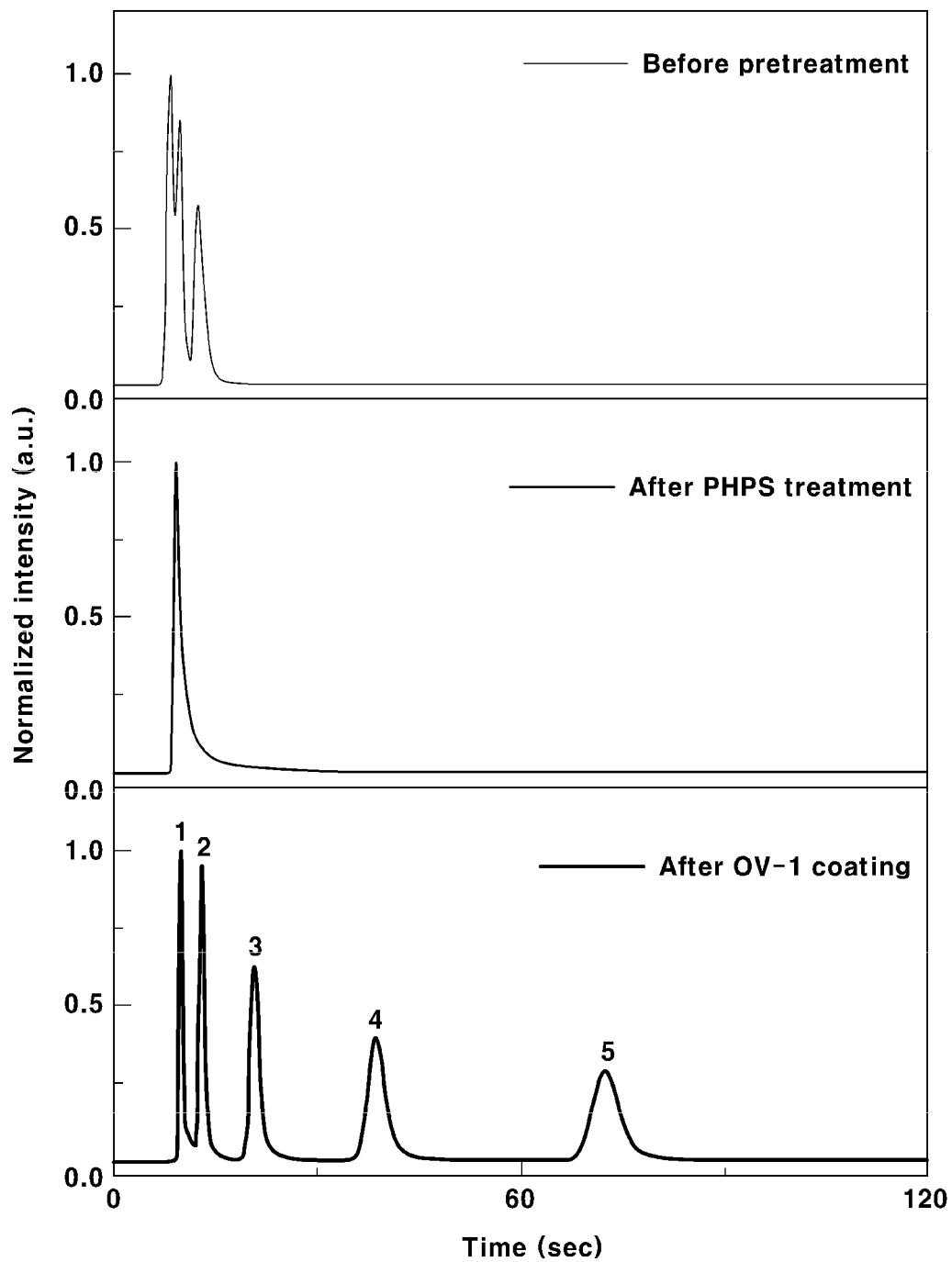

[FIG. 6b]
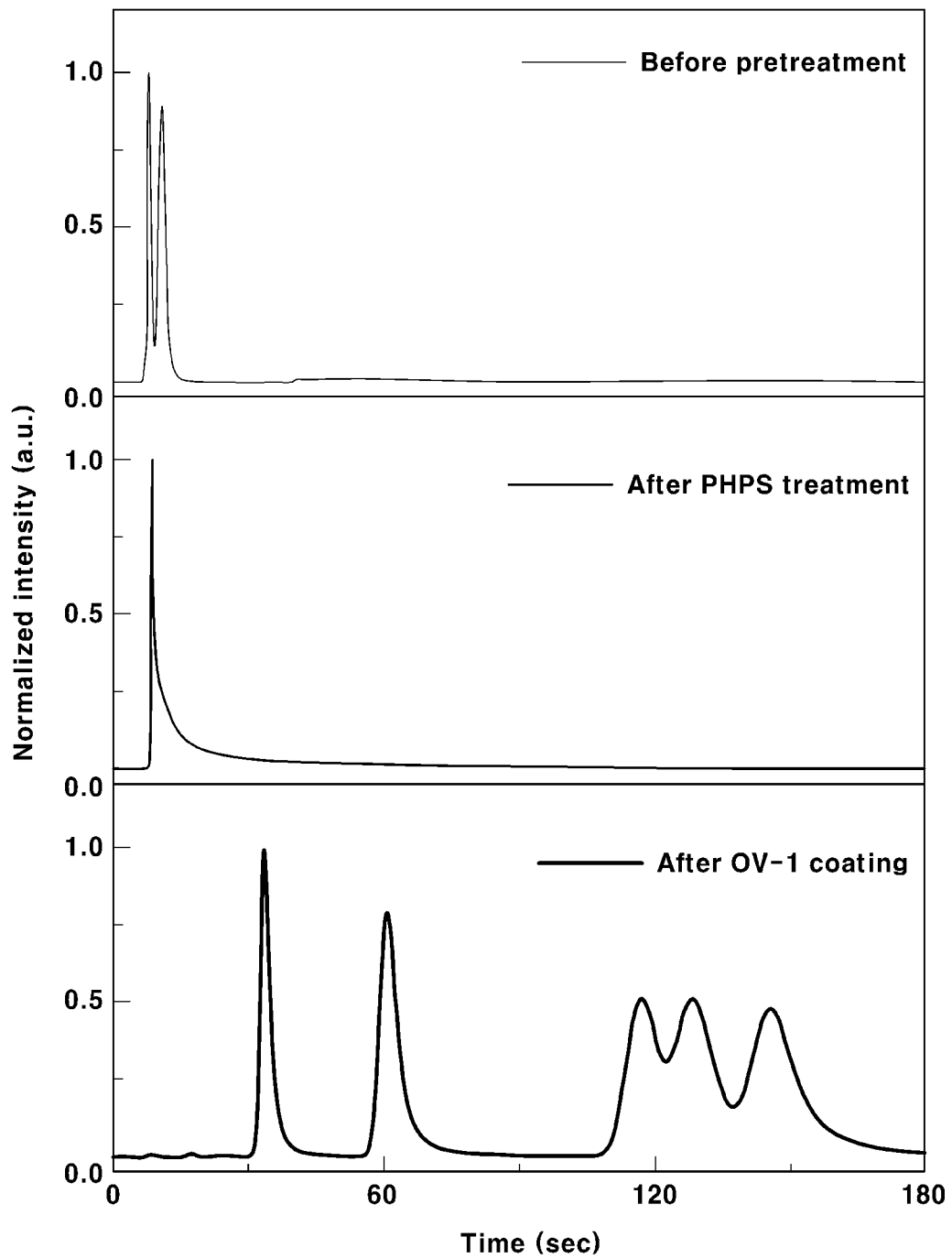

[FIG. 7]
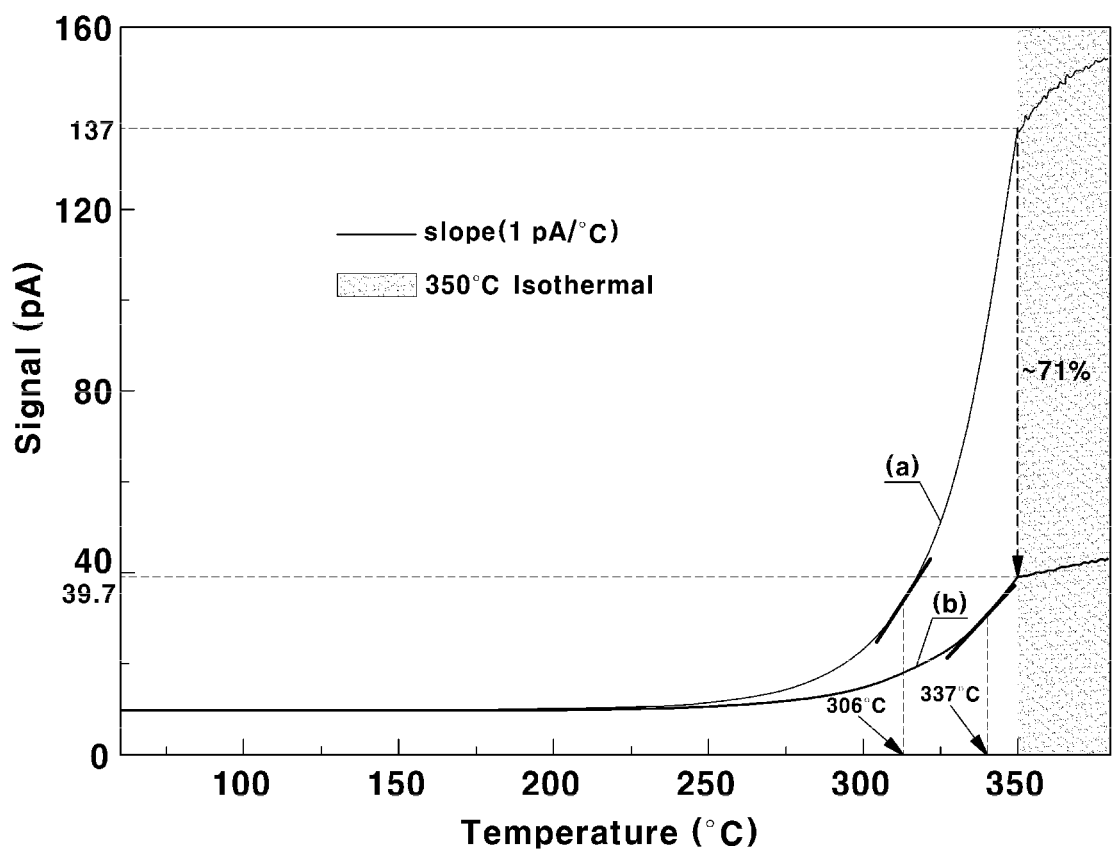

[FIG. 8]
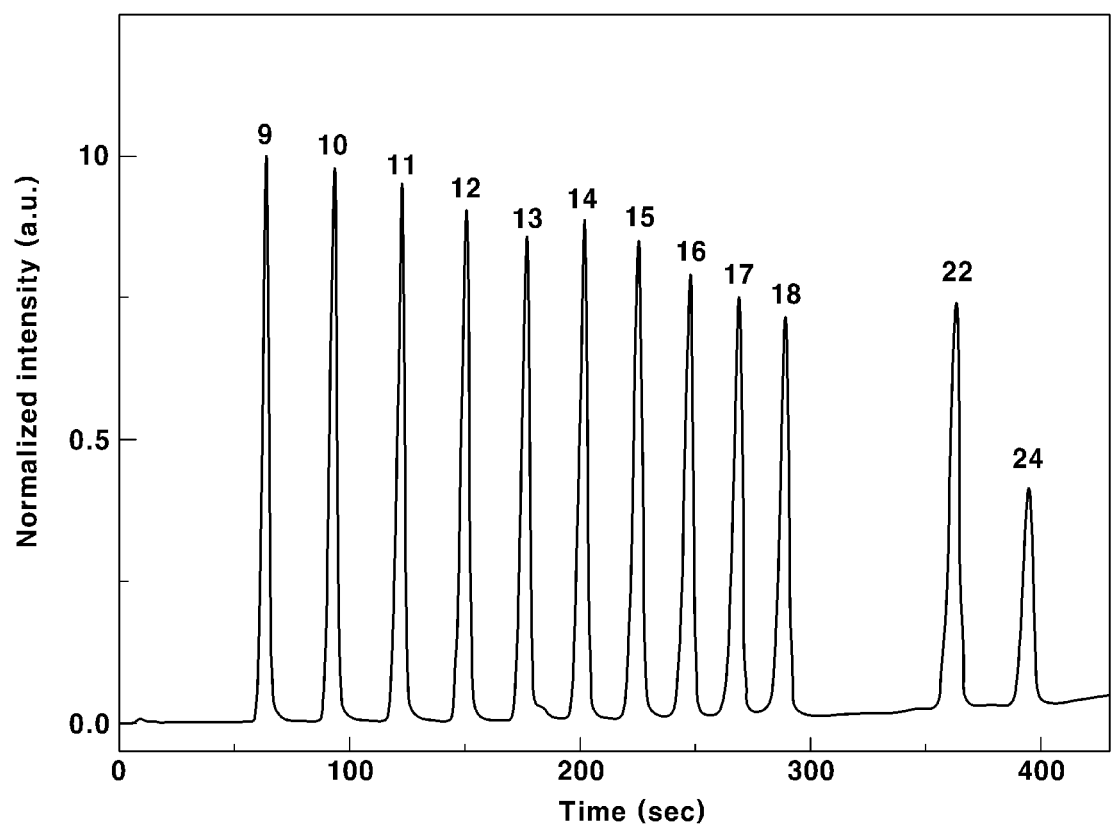

METHOD OF MANUFACTURING A METAL COLUMN

CROSS-REFERENCE TO RELATED APPLICATION

This application claims under 35 U.S.C. § 119(a) the benefit of priority to Korean Patent Application No. 10-2020-0065242 filed on May 29, 2020, the entire contents of which are incorporated herein by reference.

BACKGROUND

(a) Technical Field

The present disclosure relates to a method of manufacturing a metal column using 3D printing technology.

(b) Background Art

Volatile organic compounds (VOCs) are organic chemicals that exist as gases in the atmosphere due to their high vapor pressure at room temperature. When VOCs are combined with nitrogen oxides in the atmosphere, they react with sunlight to form particulate matter and ozone. In Korea, emissions of volatile organic compounds have steadily increased from 870,000 tons in 2010 to 920,000 tons in 2015. In addition, according to a survey conducted by the National Institute of Environmental Research in 2019, volatile organic compounds account for 29.2% of particulate matter in the metropolitan area and 30.7% of the metropolitan area in the Yeongnam area. Accordingly, the government has strengthened regulations on the control of emissions of volatile organic compounds which are responsible for the production of particulate matter and ozone, and hence facilities and industrial sites that emit large amounts of volatile organic compounds require technology for effectively detecting these volatile organic compounds. Conventional methods for detecting volatile organic compounds include gas chromatography (GC). In bench-top gas chromatography which is commonly used in analytical laboratories, a gaseous sample is injected at a high temperature and then separated by passage through a long column, and each component is measured by a detector over time. However, bench-top gas chromatography is difficult to apply in the field, due to large volume thereof. Thus, portable gas chromatography has been developed.

The most important component of gas chromatography is a column. In bench-top gas chromatography, a fused silica capillary column is most widely used, and in portable gas chromatography, a silicon/glass-micromachined column is mainly used. In the case of the micromachined column, a channel having a narrow width can be precisely machined, but the machining process is composed of several steps, and hence the manufacturing process is complicated and the entire process has to be performed in a clean room. In addition, since the machining process has to be performed by a skilled technician, the production cost is high, the yield is low, and the reproducibility is poor, making mass production difficult. In addition, the silicon/glass micromachined column has problems in that the column is fragile, and thus is difficult to use in a complex and rough site, and the bonding portion between silicon and glass may be broken depending on the heating rate because of the different thermal expansion rates of the two materials.

SUMMARY OF THE DISCLOSURE

The present disclosure has been made in an effort to solve the above-described problems associated with the prior art.

It is an object of the present disclosure to provide a method for manufacturing a metal column, which may manufacture the metal column to have a minimum porosity and physical and thermal properties similar to $Ti_6Al_4V$ Grade 23 by 3D printing a gas chromatography column with $Ti_6Al_4V$ metal powder by a direct metal laser sintering (DMLS) process, followed by heat treatment.

Another object of the present disclosure is to manufacture a metal column having a channel width and length that may be used for currently commercialized bench top gas chromatography and portable gas chromatography using 3D metal printing.

Still another object of the present disclosure is to manufacture a metal column, which is capable of separating a gas mixture into its components, by pretreating a channel inside a 3D printed metal column at low temperature and coating the channel with a stationary phase.

In one aspect, the present disclosure provides a method of manufacturing a metal column using 3D printing technology. The method of manufacturing a metal column includes steps of: creating a 3D-CAD design for printing the metal column; printing the metal column; pretreating the inner surface of a channel inside the metal column at low temperature; and coating the inner surface of the channel with a stationary phase so that the metal column is capable of separating a gas mixture into components.

In one embodiment, the step of printing the metal column includes a step of 3D printing the metal column by direct metal laser sintering (DMLS) after melting $Ti_6A_{l4}V$ Grade 23 metal powder.

In one embodiment, the metal column includes a channel inlet and a channel outlet, and the diameter of each of the channel inlet and the channel outlet is larger than the diameter of the channel.

In one embodiment, the step of pretreating the inner surface of the channel includes steps of: allowing HCl to flow into the channel by pressurizing the HCl with $N_2$ gas, and washing the channel with distilled water; and deactivating the inner surface of the channel by coating the inner surface of the channel with a perhydropolysilazane (PHPS) solution flowing into the channel.

In one embodiment, the solvent in the PHPS solution is dibutyl ether, and the PHPS solution contains a palladium (Pd) catalyst for catalyzing pyrolysis reaction.

In one embodiment, an Si—N—Si structure in the PHPS solution is converted into an Si—O—Si structure by the pyrolysis reaction.

In one embodiment, the method further includes, after coating the inner surface of the channel with the PHPS solution, a step of prebaking at a first temperature and a step of baking at a second temperature, wherein the second temperature is higher than the first temperature.

In one embodiment, coating with the PHPS solution promotes the adhesion of the stationary phase to the inner surface of the channel, thus increasing the thermal stability of the metal column.

In one embodiment, the step of coating the inner surface of the channel with the stationary phase includes a step of coating the inner surface of the channel with a solution prepared by adding OV-1, which is a kind of the stationary phase, and dicumyl peroxide to a solvent.

In one embodiment, the solvent is a solvent obtained by mixing pentane and dichloromethane at a volume ratio of 1:1.

In one embodiment, the solution is prepared by adding OV-1 to the solvent at a concentration of 0.4% (w/v) and adding dicumyl peroxide thereto in an amount of 1 part by weight based on 100 parts by weight of OV-1.

In one embodiment, the method further includes, after the step of coating the inner surface of the channel with the solution prepared by adding OV-1 and dicumyl peroxide to the solvent, a step of curing the OV-1 coating, wherein the step of curing the OV-1 coating includes steps of: heating the metal column at a first heating rate until the first temperature is reached; heating the metal column at a second heating rate from the first temperature until a second temperature is reached; and heating the metal column for a predetermined time while maintaining the second temperature, wherein the first heating rate is higher than the second heating rate.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a flowchart illustrating a method for manufacturing a metal column according to an embodiment of the present disclosure;

FIG. 2 is a CAD design image for printing the metal column according to the embodiment of the present disclosure;

FIG. 3 is a view illustrating a system structure and a method for implementing direct metal laser sintering (DMLS) technology according to an embodiment of the present disclosure;

FIG. 4A is a plan view of the metal column according to the embodiment of the present disclosure, observed with a 3D X-ray microscope;

FIG. 4B is a side view of the metal column according to the embodiment of the present disclosure, observed with a 3D X-ray microscope;

FIG. 5 is a Fourier transform-infrared spectroscopy (FT-IR) spectrum indicating whether a channel in a 3D printed metal column was well coated with PHPS;

FIG. 6A is a gas chromatogram showing the separation of an alkane mixture into components by the metal column according to the embodiment of the present disclosure, before pretreatment of the channel of the metal column, after PHPS coating of the channel and after OV-1 coating of the channel.

FIG. 6B is a gas chromatogram showing the separation of an aromatic mixture into components by the metal column according to the embodiment of the present disclosure, before pretreatment of the channel of the metal column, after PHPS coating of the channel and after OV-1 coating of the channel.

FIG. 7 is a graph showing flame ionization detector (FID) signals indicating the difference in background signal at high temperature between a non-PHPS-coated column (a) and a PHPS-coated column (b) after coating with a stationary phase (OV-1).

FIG. 8 is a gas chromatogram showing that a mixture (C9-C18, C22, and C24) containing alkane molecules having large numbers of carbon atoms is separated into components thereof with low bleeding even at high temperatures by the metal column according to the embodiment of the present disclosure.

DETAILED DESCRIPTION

The advantages and features of the present disclosure, and the way of attaining the same, will become apparent with reference to the embodiments described below in conjunction with the accompanying drawings. However, the present disclosure is not limited to the embodiments disclosed below and may be embodied in a variety of different forms. Rather, these embodiments are provided so that this disclosure will be thorough and complete, and will fully convey the scope of the present disclosure to those skilled in the art. The scope of the present disclosure will be defined only by the appended claims. Throughout the specification, like reference numerals refer to like components.

In addition, in the specification, terms such as "first" and "second" are used to arbitrarily distinguish between the elements such terms describe. Thus, these terms are not necessarily intended to indicate temporal or other prioritization of such elements.

The detailed description is intended to illustrate and describe the present disclosure. It is to be understood that the present disclosure may be used in various different combinations, modifications and environments. That is, changes or modifications are possible within the scope of the inventive concepts disclosed herein, within the scope of equivalents to those described, and/or within the skill or knowledge of those skilled in the art. The embodiments are provided to describe the best mode for implementing the technical idea of the present disclosure, and various modifications required in the specific application field and use of the present disclosure are also possible. Accordingly, the detailed description of the present disclosure is not intended to limit the present disclosure to the disclosed embodiments. In addition, the appended claims should be construed to include other embodiments.

FIG. 1 is a flowchart illustrating a method for manufacturing a metal column according to an embodiment of the present disclosure.

Referring to FIG. 1, a metal column may be manufactured using 3D printing technology. Specifically, a metal column may be manufactured using 3D printing (also referred to as additive manufacturing). To this end, a 3D-CAD (computer-aided design) design for a metal column to be manufactured may be created. 3D printing or additive manufacturing is a new manufacturing method that includes creating a design for an article to be manufactured, converting the design into a CAD file, sending the CAD file to a 3D printer, and then manufacturing the article by stacking layers one by one using the 3D printer. This method has advantages in that it can implement even complex designs that are impossible by conventional manufacturing methods (casting, welding, cutting, sintering, etc.), and it has high accuracy and reproducibility, can shorten manufacturing time, and can significantly lower the manufacturing cost depending on the material (S100).

The metal column may be printed by a 3D printer. At this time, the metal column may be manufactured using metal powder. A specific method for printing by the 3D printer will be described below with reference to FIG. 3.

Generally, 3D printing is performed using a polymer, but in gas chromatography, a process of continuously heating an oven to high temperature must usually be performed. For this reason, a polymer that is modified at high temperature is not suitable as a material for a column that is applied to gas chromatography. In this regard, the metal column using metal powder by 3D metal printing has great advantages over a polymer in that it has excellent chemical and physical stability and is not modified by high temperatures or various external stimuli (S200).

After the metal column is manufactured, the inner surface of a channel formed in the metal column may be pretreated at low temperature. Pretreatment of the inner surface of the channel in the metal column may include: a first pretreatment step of allowing HCl to flow into the channel of the metal column by pressurizing the HCl with $N_2$ gas and washing the channel with distilled water; and a second pretreatment step of deactivating the inner surface of the channel by coating the inner surface of the channel with a perhydropolysilazane (PHPS) solution flowing into the channel.

In the first pretreatment step, HCl may be allowed to flow into the channel of the metal column by pressurizing the same with $N_2$ gas in order to wash the channel of the metal column manufactured by 3D printing. For example, as HCl, 5 ml of 3.5% HCl may be used. Thereafter, HCl remaining in the channel may be washed out with distilled water.

In the second pretreatment step, the inner surface of the channel may be coated with a PHPS solution. As the inner surface of the channel is coated with the PHPS solution, the surface of the channel in the metal column may be deactivated.

The solvent in the PHPS solution may be dibutyl ether, and the PHPS solution may contain a palladium (Pd) catalyst for catalyzing pyrolysis reaction. For example, the PHPS solution may have a PHPS concentration of 10 mass %. After the inner surface of the channel is coated with the PHPS solution, a step of prebaking at a first temperature and a step of baking at a second temperature may be performed. At this time, the second temperature may be higher than the first temperature. For example, the first temperature may be 110° C., and the second temperature may be 180° C. The step of prebaking the metal column may be performed for about 5 minutes, and the step of baking the metal column may be performed in a steam oven at 180° C. for 1 hour and 30 minutes. Before pyrolysis, the PHPS is composed of Si, N and H, and after pyrolysis through the baking process, the PHPS is converted into Si and O. In other words, as shown in the following reaction scheme, the Si—N—Si structure in the PHPS solution may be pyrolyzed into an Si—O—Si structure. Since the baking process is performed in a steam oven, the PHPS solution is modified with silica, and thus the stability of the inner surface of the channel of the metal column may be enhanced.

Reaction Scheme

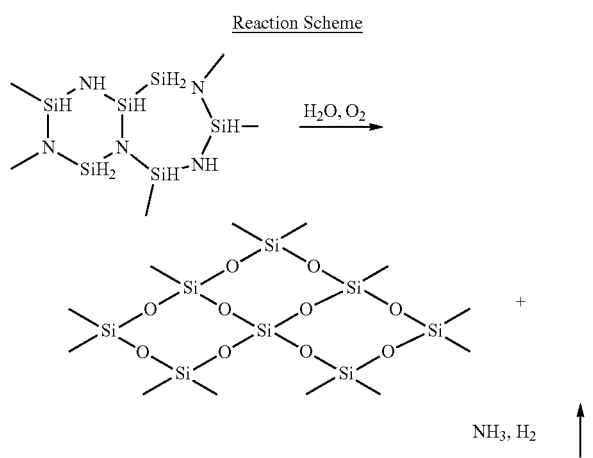

The use of the palladium catalyst may catalyze pyrolysis at a temperature of 180° C., which is much lower than that in a conventional process (350 to 600° C.), and may also shorten the reaction time to about 1 hour. That is, as the palladium catalyst is added to the solution, it is possible to heat-treat the metal column at low temperature (S300).

After the process of pretreating the inner surface of the channel of the metal column, the inner surface of the channel may be coated with a stationary phase so that the channel can separate a gas mixture into components. To coat the inner surface of the channel with the stationary phase, it is possible to use a solution prepared by adding OV-1 (polydimethylsiloxane (PDMS)), which is a kind of stationary phase, and dicumyl peroxide to a solvent. For example, the solvent may be a solvent obtained by mixing pentane and dichloromethane at a volume ratio of 1:1. For example, the solution may be a solution prepared by adding OV-1 to the solvent at a concentration of 0.4% (w/v) and adding dicumyl peroxide thereto in an amount of 1 part by weight based on 100 parts by weight of OV-1. For coating with the stationary phase, a static coating method among stationary phase coating methods may be used. Static coating can predict the thickness of the stationary phase from the concentration of the solution, unlike dynamic coating, and coat the stationary phase evenly compared to dynamic coating. The thickness of the stationary phase coating according to the embodiment of the present disclosure may be estimated to be 0.5 μm.

After the inner surface of the channel is coated with the solution prepared by adding the OV-1 solution and dicumyl peroxide to the solvent, a step of curing the OV-1 coating may be performed. The step of cutting the OV-1 coating may include: a first step of heating the metal column at a first heating rate until the first temperature is reached; a second step of heating the metal column at a second heating rate from the first temperature until a second temperature is reached; and a third step of heating the metal column for a predetermined time while maintaining the second temperature. At this time, the first heating rate may be higher than the second heating rate, and the second temperature may be higher than the first temperature. For example, the first temperature may be 160° C., and the second temperature may be 180° C. For example, the first heating rate may be 5° C./min, and the second heating rate may be 0.5° C./min. For example, the predetermined time when the second temperature is maintained may be about 1 hour (S400).

Generally, the inner surface of a channel in a gas chromatography column is coated with a polymer so that the column can separate a gas mixture into components. However, the metal surface has high activity, unlike the silica, silicon wafer or glass surface, and hence is highly likely to undesirably adsorb gas molecules to be analyzed. In addition, the metal surface is highly likely to be modified by oxidation, and the stationary phase can be easily peeled off at high temperatures due to its low adhesion so that the metal surface cannot be reused. Generally, the metal surface is deactivated by allowing a silane solution to flow thereon under high-temperature and high-pressure conditions for a long time, but this deactivation method is not commonly used because it is not easy to control the environment in which the deactivation method is performed.

According to the embodiment of the present disclosure, a column is manufactured using the metal material, and a process of coating the surface of the channel in the metal column with a PHPS solution to deactivate the surface may be performed. In addition, since the palladium catalyst is added to the PHPS solution, the process according to the embodiment of the present disclosure can deactivate the channel of the metal column within a short time at a relatively low temperature compared to the conventional process of deactivating the inner surface of the channel with the silane solution.

According to the embodiment of the present disclosure, the inner surface of the channel may be deactivated by coating the 3D printed metal column with PHPS by pyrolysis at low temperature. The deactivated surface may reduce irreversible adsorption with analytes and also minimize peeling of the stationary phase at high temperature.

According to the embodiment of the present disclosure, adhesion of the stationary phase to the inner surface of the channel may be promoted by coating with the PHPS solution, thereby increasing the thermal stability of the metal column. In addition, the metal column coated with the stationary phase is not thermally modified even at high temperature, and can maintain stable performance as heat is spread evenly throughout the column.

FIG. 2 is a CAD design image for printing a metal column according to an embodiment of the present disclosure.

Referring to FIGS. 1 and 2, a 3D-CAD design may be created to print a metal column 300. The metal column 300 may be printed by controlling a 3D printer depending on the created 3D-CAD design. The following description is based on the 3D-CAD design, but may be the same as the description of the metal column 300 that is finally manufactured.

The metal column may be provided with a channel 310 therein, and both ends of the channel 310 may be provided with a channel inlet 320a and a channel outlet 320b. The channel 310 may preferably be formed to have a total length of 1 m. The metal column 300 may have a cuboid shape with sides having a first width d1 and a second width d2 and with a height h. For example, the first width d1 may be 3.4 cm, the second width d2 may be 3.3 cm, and the height h may be 0.2 cm. The channel 310 may be formed to a narrow width of about 0.5 mm or less. The diameter of each of the channel inlet 320a and the channel outlet 320b may be larger than the diameter of the channel 310. For example, the diameter of each of the channel inlet 320a and the channel outlet 320b may be 0.8 mm.

As described above, the diameter of each of the channel 310, the channel inlet 320a, and the channel outlet 320b may vary depending on a compatible gas chromatography system.

FIG. 3 is a view illustrating a system structure and a method for implementing direct metal laser sintering (DMLS) technology according to an embodiment of the present disclosure.

Referring to FIGS. 1 and 3, a 3D printer 10 may be used to print a metal column. In an embodiment of the present disclosure, it is possible to use the 3D printer 10 that can perform 3D printing by a direct metal laser sintering (DMLS) process after melting metal powder 200. The 3D printer 10 may be composed of a laser 110, a manufacturing platform 130, a dispenser platform 150, and a recoater arm 180. At this time, the metal powder 200 may be $Ti_6Al_4V$ Grade 23.

First, the metal powder 200 located on the manufacturing platform 130 may be melted using the laser 110. Thereafter, as the manufacturing platform 130 descends, the recoater arm 180 may move the metal powder 200 from the dispenser platform 150 to the manufacturing platform 130. In 3D printing, a part of a model to be manufactured is manufactured for each layer, and thus the above-described process can be repeatedly performed until the metal column is completed. After the metal column is printed, the metal powder 200 remaining in the metal column may be removed by a vacuum pump. Thereafter, the metal column may be heat-treated at 800° C. for 2 hours to reduce residual stress, and then washed with ethanol and DI water.

This direct metal laser sintering (DMLS) technology is one of 3D printing techniques for selectively bonding the metal powders 200 on the manufacturing platform 130 by the high-power laser 110. DMLS can realize a complex design compared to other 3D metal printing methods, and can rapidly print a high-resolution product, thus significantly reducing manufacturing time. Through DMLS technology, a channel having a width of 0.5 mm or less can be manufactured, and a metal column which is advantageous in terms of strength, thermal stability, and the like can be manufactured.

FIG. 4A is a plan view of a metal column according to an embodiment of the present disclosure, observed with a 3D X-ray microscope, and FIG. 4B is a side view of the metal column according to the embodiment of the present disclosure, observed with a 3D X-ray microscope.

Referring to FIGS. 4A and 4B, the channel 310 formed in the metal column cannot be visually observed, and thus the channel was observed by a non-destructive method using a high-resolution 3D X-ray microscope (3D-XRM). 3D-XRM can be visualized by imaging the cross-section of the material with a submicron spatial resolution and rotating the sample 360°. After the 3D-XRM image is acquired, the image is reconstructed, and a 3D XRM video and images are created using ORS Visual software. FIGS. 4A and 4B are 3D-XRM images of the top and side surfaces of the 3D printed metal column. It can be seen that the channel and the connection part were formed as modeled and that the channel was made without clogging and cracking.

Since 3D metal printing manufactures a product by melting metal powders with a laser, pores between the powders may sometimes remain in the product without being removed, thus degrading the overall performance of the product. In the case of the 3D printed metal column according to the embodiment of the present disclosure, it was confirmed that the porosity of the metal column was very low at 0.07% of the total volume, as observed by 3D-XRM, and the size of the pores was also 0.001 to 0.07 mm in diameter, indicating that the pores had no effect on channel formation and channel spacing. The thermal expansion rate and thermal conductivity of the metal column were measured to be 9.85 μm/(m° C.) and 6.63 to 9.65 W/(mK), respectively, which are very similar to those of $Ti_6Al_4V$ grade 23. That is, it was confirmed that the manufactured 3D-printed metal column had thermal performance similar to that of conventional $Ti_6Al_4V$.

The 3D printed metal column according to the embodiment of the present disclosure is manufactured by printing the inside of a metal plate having a size of 3.4×3.3×0.2 cm with the $Ti_6Al_4V$ grade 23 powders by the DMSL technique. The manufactured metal column may have a very low porosity (a porosity of about 0.07%) and have physical and thermal properties similar to $Ti_6Al_4V$ grade 23. Thus, the user can use the metal column, manufactured according to the embodiment of the present disclosure, by connecting the same to existing bench-top gas chromatography or portable gas chromatography.

FIG. 5 is a Fourier transform-infrared spectroscopy (FT-IR) spectrum indicating whether the channel inside the 3D printed metal column was well coated with PHPS. Specifically, FIG. 5(a) shows the FT-IR spectrum of the PHPS film before pyrolysis, and FIG. 5(b) shows the FT-IR spectrum of the PHPS film after pyrolysis.

Referring to FIG. 5, the $Ti_6Al_4V$ grade 23 plate obtained by 3D printing under the same conditions was used to measure FT-IR spectra. As shown in FIG. 5(a), the FT-IR spectrum of the PHPS film before pyrolysis shows clear stretching vibrations of N—H, Si—H, N—H and Si—N—Si at 3373, 2157, 1177 and 818 cm$^{-1}$. On the other hand, as shown in FIG. 5(b), after heat treatment at 180° C., all the above-mentioned bonds associated with the Si—N—Si structure disappeared, and vibrational bonds associated with the Si—O—Si structure appeared at 1040.68 cm$^{-1}$ and 810 cm$^{-1}$. That is, FIG. 5 is a graph showing that complete conversion of the PHPS film occurred. Thus, it can be seen that complete conversion of PHPS also occurred on the inner surface of the PHPS-coated metal column.

FIG. 6A is a gas chromatogram showing the separation of an alkane mixture into components by the channel of the metal column according to the embodiment of the present disclosure, before pretreatment of the channel, after PHPS coating of the channel and after OV-1 coating of the channel, and FIG. 6B is a gas chromatogram showing the separation of an aromatic mixture into components by the channel of the metal column according to the embodiment of the present disclosure, before pretreatment of the channel, after PHPS coating of the channel and after OV-1 coating of the channel.

Referring to FIGS. 6A and 6B, an alkane mixture of pentane, hexane, heptane, octane and nonane and an aromatic mixture of benzene, toluene, ethylbenzene, m-xylene and styrene were used to confirm the gas separation effect of the stationary phase. All gas chromatography measurements were performed under the same pressure and temperature conditions.

When chromatography was performed using the 3D printed metal column before the metal column was pretreated, all the mixtures were not separated into components, and 2 or 3 peaks appeared within 30 seconds. This is because an activated portion of the surface of the channel reacted with the analyte.

When chromatography was performed using the 3D printed metal column after the channel of the metal column was treated with PHPS, a single peak was observed in all mixtures. This is because the metal surface was deactivated and did not react with all mixtures.

Finally, when chromatography was performed using the 3D printed metal column after the column of the metal column was coated with the stationary phase, all the mixtures were separated into components within 2 minutes. In particular, all the peaks were symmetrical without tailing. Tailing means that the peak symmetry of the chromatographic mixture is broken. In conclusion, it can be confirmed that the resolution of the metal column coated with the stationary phase increased.

FIG. 7 is a graph showing flame ionization detector (FID) signals indicating the difference in background signal at high temperature between the non-PHPS-coated column (a) and the PHPS-coated column (b) after coating of each column with the stationary phase (OV-1). FIG. 7 is a chromatogram obtained by conditioning the metal column, raising the temperature of the conditioned metal column from 60° C. to 350° C. at a heating rate of 15° C./min, and maintaining the metal column at 350° C.

Referring to FIG. 7, an important factor that affects column performance is column bleeding, which is thermal degradation of the stationary phase (OV-1) during temperature rise. Column bleeding occurs when PDMS is decomposed with increasing temperature to produce volatile cyclic oligomers which significantly increase the background signal. Therefore, column bleeding adversely affects not only the peak separation time and resolution of the mixture, but also the coated film thickness and surface.

The baseline of each of the non-PHPS-coated column (a) and the PHPS-coated column (b) remained constant until 250° C., but the baseline of the non-PHPS-coated column greatly increased to 137 pA at 350° C. However, the PHPS-coated column (b) had less bleeding, and thus the baseline thereof increased to 39.7 pA at 350° C. That is, the PHPS-coated column (b) showed 71% lower bleeding than the non-PHPS-coated column (a) at 350° C. In addition, the temperatures of the non-PHPS-coated column (a) and the PHPS-coated column (b) at a bleeding rate of 1 pA/° C. were 306° C. and 337° C., respectively. This is because PHPS treatment promotes adhesion of the stationary phase (OV-1) to the inner surface of the channel of the metal column, thus significantly increasing the thermal stability of the metal column. Thus, the PHPS-coated column (b) can be used even at high temperatures, demonstrating that the PHPS-coated column can also be used to separate a low-volatility mixture into components.

FIG. 8 is a gas chromatogram showing that a mixture containing alkane molecules having large numbers of carbon atoms (C9 to C18, C22, and C24) are separated into components thereof with low bleeding even at high temperatures by the metal column according to the present disclosure.

FIG. 8 is a chromatogram obtained by performing separation of a mixture of 12 alkanes, including C9-C18, C22 and C24 (tetracosane), which have low volatility, by the use of the metal column coated with the stationary phase. It should be noted that C24 (tetracosane) is the last alkane analyte that can be injected into a gas chromatography system because of its high boiling point (391° C.). The mixture was injected at 400° C. and analyzed at a temperature from 40° C. to 250° C. at a rate of 30° C./min. Relatively light analytes such as C9 to C16 molecules were analyzed without column bleeding, and other molecules were detected in a state in which the background signal slightly increased. However, due to less bleeding, the overall performance of the metal column was not significantly affected.

As described above, according to the present disclosure, a column is manufactured using the metal material, and a process of coating the surface of the channel in the metal column with a PHPS solution to deactivate the surface may be performed. In addition, since the palladium catalyst is added to the PHPS solution, the process according to the embodiment of the present disclosure can deactivate the channel of the metal column within a short time at a relatively low temperature compared to the conventional process of deactivating the inner surface of the channel with the silane solution.

According to the embodiment of the present disclosure, the inner surface of the channel may be deactivated by coating the 3D printed metal column with PHPS by pyrolysis at low temperature. The deactivated surface may reduce irreversible adsorption with analytes and also minimize peeling of the stationary phase at high temperature.

According to the embodiment of the present disclosure, adhesion of the stationary phase to the inner surface of the channel may be promoted by coating with the PHPS solution, thereby increasing the thermal stability of the metal column. In addition, the metal column coated with the stationary phase is not thermally modified even at high temperature, and can maintain stable performance as heat is spread evenly throughout the column.

Although the embodiments of the present disclosure have been described above with reference to the accompanying drawings, those skilled in the art to which the present disclosure pertains will appreciate that the present disclosure may be embodied in other specific forms without departing from the technical spirit or essential features of the present disclosure. Therefore, it should be understood that the embodiments described above are illustrative in all respects and not restrictive.

What is claimed is:

1. A method of manufacturing a metal column using 3D printing technology, the method comprising steps of:
creating a 3D-CAD design for printing the metal column;
printing the metal column;
pretreating an inner surface of a channel inside the metal column; and
coating the inner surface of the channel with a stationary phase so that the metal column is capable of separating a gas mixture into components,
wherein the step of pretreating the inner surface of the channel comprises steps of:
allowing HCl to flow into the channel by pressurizing the HCl with $N_2$ gas, and washing the channel with distilled water; and
deactivating the inner surface of the channel by coating the inner surface of the channel with a perhydropolysilazane (PHPS) solution flowing into the channel.

2. The method of claim 1, wherein the step of printing the metal column comprises 3D printing the metal column by melting Ti-6Al-4V Grade 23alloy using direct metal laser sintering (DMLS).

3. The method of claim 2, wherein the metal column comprises a channel inlet and a channel outlet, and a diameter of each of the channel inlet and the channel outlet is larger than a diameter of the channel.

4. The method of claim 1, wherein a solvent in the PHPS solution is dibutyl ether, and the PHPS solution contains a palladium (Pd) catalyst for catalyzing pyrolysis reaction.

5. The method of claim 4, wherein an Si—N—Si structure in the PHPS solution is converted into an Si—O—Si structure by the pyrolysis reaction.

6. The method of claim 1, further comprising, after coating the inner surface of the channel with the PHPS solution, a step of prebaking at a first temperature and a step of baking at a second temperature,
wherein the second temperature is higher than the first temperature.

7. The method of claim 1, wherein coating with the PHPS solution promotes adhesion of the stationary phase to the inner surface of the channel, thus increasing the thermal stability of the metal column.

8. The method of claim 1, wherein the step of coating the inner surface of the channel with the stationary phase comprises a step of coating the inner surface of the channel with a solution prepared by adding the stationary phase and dicumyl peroxide to a solvent.

9. The method of claim 8, wherein the solvent is a solvent obtained by mixing pentane and dichloromethane at a volume ratio of 1:1.

10. The method of claim 9, wherein the solution is prepared by adding the stationary phase to the solvent at a concentration of 0.4% (w/v) and adding dicumyl peroxide thereto in an amount of 1 part by weight based on 100 parts by weight of the stationary phase.

11. The method of claim 8, further comprising, after coating the inner surface of the channel with the solution prepared by adding the stationary phase and dicumyl peroxide to the solvent, a step of curing the stationary phrase coating,
wherein the step of curing the stationary phase coating comprises steps of:
heating the metal column at a first heating rate until the first temperature is reached;
heating the metal column at a second heating rate from the first temperature until a second temperature is reached; and
heating the metal column for a predetermined time while maintaining the second temperature,
wherein the first heating rate is higher than the second heating rate.

* * * * *